United States Patent [19]

Onoda et al.

[11] 3,922,300

[45] Nov. 25, 1975

[54] PROCESS FOR PREPARING AN UNSATURATED ESTER

[75] Inventors: Takeru Onoda; Akira Yamura, both of Yokohoma; Akihisa Ohno, Kawasaki; Junzo Haji, Tokyo; Jun Toriya, Kurashiki; Masato Sata, Kurashiki; Naoatsu Ishizaki, Kurashiki, all of Japan

[73] Assignee: Mitsubishi Chemical Industries Ltd., Tokyo, Japan

[22] Filed: May 22, 1974

[21] Appl. No.: 472,158

[30] Foreign Application Priority Data

May 22, 1973 Japan.................................. 48-56986

[52] U.S. Cl....... 260/497 A; 260/410.6; 260/468 R; 260/476 R
[51] Int. Cl.² .......................................... C07C 67/05
[58] Field of Search ................................. 260/497 A

[56] References Cited
UNITED STATES PATENTS 3,755,423  8/1973  Onada et al. ................... 260/497 A
3,775,342  11/1973 Kronig et al. ................... 260/497 A

FOREIGN PATENTS OR APPLICATIONS 2,012,903  3/1970  Germany ........................ 260/497 A Primary Examiner—James A. Patten
Assistant Examiner—R. D. Kelly
Attorney, Agent, or Firm—Oblon, Fisher, Spivak, McClelland & Maier

[57] ABSTRACT

Unsaturated glycol diesters are prepared in an extremely high degree of conversion and selectivity by reacting a conjugated diene, a carboxylic acid and oxygen in the presence of a solid, active, long-lived catalyst composed of a mixture of palladium and at least one component of antimony, bismuth, selenium or tellurium supported on activated carbon, which catalyst is prepared by subjecting the mixture to reduction, treating the mixture with oxygen or an oxygen-containing gas at an elevated temperature and subjecting the treated mixture to reduction again.

25 Claims, No Drawings

PROCESS FOR PREPARING AN UNSATURATED ESTER

BACKGROUND OF THE INVENTION

1. Field of the Invention

The present invention relates to a process for preparing a glycol diester from a conjugated diene. More particularly, this invention relates to a process for preparing unsaturated glycol diesters in high yield by reacting molecular oxygen, a conjugated diene and a carboxylic acid in the presence of a solid catalyst.

2. Description of the Prior Art

Glycols are used industrially as solvents and as intermediates for the preparation of various useful compounds. For instance, butanediol is used as an intermediate for pyrolidone, or for tetrahydrofuran, an organic solvent which has heretofore been prepared industrially from acetylene by the Reppe reaction, by hydrogenation and hydrolysis of a butenediol diester, and by other processes.

Butenediol diesters have been prepared by a two step reaction involving halogenating butadiene to synthesize a dihalogenated butene, and then converting the dihalogenated butene to the butenediol diester. Another known method of synthesizing butenediol diesters is to pass butadiene and oxygen into a dissolved palladium salt and/or copper salt containing an organic acid, in a one step reaction. Although the one step method is industrially advantageous because high reaction velocities are obtained with a palladium salt-redox catalyst, the method suffers from the disadvantage of a complicated separation and recovery of the catalyst, since the palladium salt is homogeneously dissolved in the reaction solution. Moreover, loss of expensive palladium is inevitable, so that an industrial scale operation would be uneconomical.

In addition, the carboxylation of a conjugated diene using a palladium salt-redox catalyst system will generally involve predominate carboxylation of adjacent carbon atoms. That is, carboxylation of 1, 3-butadiene will usually result in formation of 3, 4-dicarboxy-1-butene rather than the more industrially desirable 1, 4-dicarboxy-2-butene. The latter is usually obtainable only in amounts up to 50 percent.

Other prior art procedures for improving the deficiencies of the conventional methods have involved a process for preparing an unsaturated glycol diester having an added acyloxy group on each end of the conjugated double bond of raw material diene in high yield by reacting molecular oxygen, a conjugated diene and a carboxylic acid in the presence of a solid catalyst containing palladium and at least one element selected from the group consisting of antimony, bismuth, tellurium and selenium as described in U.S. Pat. No. 3,755,423; British patent application No. 17530/72; French Pat. No. 782,081; West German application No. P 22 17 452.8; Canadian application No. 139,576; Dutch application No. 72 05 150 and Italian Pat. No. 958,745.

Another approach has involved a process for preparing a more efficient catalyst by treating the catalyst having the components described above, after reduction, with a molecular oxygen-containing gas at an elevated temperature as disclosed in Japanese Pat. application No. 14421/73.

A need exists, therefore, for a method of producing glycoldiesters in high yields and high selectivity which is simple and does not involve the loss of uneconomical amounts of palladium.

SUMMARY OF THE INVENTION

Accordingly, one object of the present invention is to provide an industrially advantageous process for preparing unsaturated glycol diesters.

Another object of the present invention is to improve the catalyst containing palladium and at least one component selected from the group consisting of antimony, bismuth, tellurium and, selenium, which is used for the preparation of unsaturated glycol diesters.

Briefly, these and other objects of the present invention as will hereinafter become more readily apparent have been attained by reacting molecular oxygen, a carboxylic acid and a conjugated diene in the presence of a solid catalyst prepared by supporting a mixture of palladium and at least one compound selected from the group consisting of antimony, bismuth, selenium and tellurium on activated carbon, and after reducing, treating the catalyst with molecular oxygen or an oxygen-containing gas at an elevated temperature and reducing again.

DETAILED DESCRIPTION OF THE PREFERRED EMBODIMENTS

Suitable conjugated dienes which may be used in the process of this invention include butadiene or a hydrocarbon-substituted butadiene derivative such as isoprene, 2, 3-dimethylbutadiene, piperylene, of the like, represented by the formula:

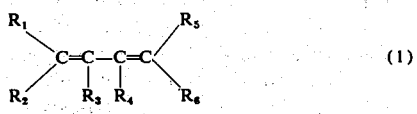

wherein $R_1$ to $R_6$ are hydrogen atoms or hydrocarbon groups, preferably alkyl groups. If any of $R_1$ to $R_6$ is a hydrocarbon group, the number of carbon atoms in the group is preferably below 6, but is not limited to this number. Butadiene and isoprene are preferred and butadiene is the most preferred diene.

The conjugated diene need not be in purified form and may contain inert gases, such as nitrogen, or the like, or a saturated hydrocarbon, such as methane, ethane, butane, and others.

Suitable carboxylic acids include any aliphatic, alicyclic, or aromatic acids, such as benzoic acid, cyclohexane carboxylic acid, or the like. Lower aliphatic carboxylic acids such as acetic acid, propionic acid, butyric acid, or the like are industrially desirable. Acetic acid is particularly preferable, whereby the reaction will proceed as follows:

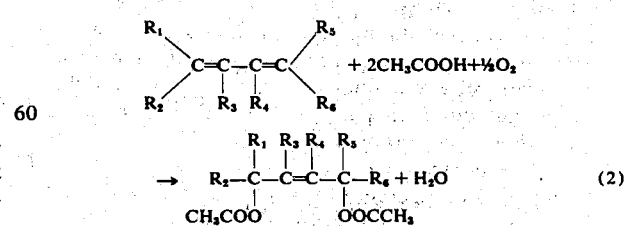

wherein $R_1$ to $R_6$ are as defined above. 1, 4-Diacetoxy-2-butene which has an acetoxy group on each end of the conjugated double bonds of the starting diene is the main product.

The catalyst used in the process of the invention is prepared by supporting palladium and at least one metal selected from the group consisting of antimony, bismuth, selenium and tellurium on activated carbon, and, after reducing, treating the catalyst with oxygen or an oxygen-containing gas at elevated temperatures and thereafter reducing again.

For supporting the catalyst on activated carbon any known method for preparing a metallic catalyst on a carrier may be utilized. A preferable procedure is to support an appropriate palladium compound and at least one compound of antimony, bismuth, selenium or tellurium on activated carbon and to subsequently subject the compounds to reducing conditions.

For example, the catalyst may be prepared by placing activated carbon into a solution of a palladium compound, an antimony compound, a bismuth compound, a tellurium compound and/or a selenium compound in an appropriate solvent, removing the solvent by distillation to deposit the above components on the activated carbon, and thereafter reducing the compounds in a gaseous stream of hydrogen or a reducing organic compound such as methanol, carbon monoxide, formaldehyde, formic acid, ethylene, or the like, or in a solution containing a reducing agent, such as hydrazine or formaldehyde. The supported catalyst may also be prepared by placing activated carbon into a solution of a palladium compound, an antimony compound, bismuth compound, tellurium compound and/or selenium compound, and subsequently adding a precipitant, such as, for example, an alkali, to precipitate the components onto activated carbon. Thereafter, the supported components are subjected to reduction as described above.

The palladium, antimony, bismuth, tellurium and/or selenium may be simultaneously or successively supported onto activated carbon.

The activated carbon carrier is preferably heat treated in an aqueous solution of nitric acid, although commercially available activated carbon may be used with no further treatment. Activated carbon may also be treated at the time of supporting the catalyst components thereon instead of treating the carrier previously with an aqueous solution of nitric acid. That is, activated carbon may be placed into an aqueous solution of nitric acid containing dissolved palladium or palladium and another component, and then subjected to heat. When using a catalyst in which the activated carbon is subjected to such treatment with nitric acid, an unsaturated glycol diester having an acetoxy group on both ends of a conjugated diene is obtained via a more reactive and selective process.

Suitable palladium compounds for preparing the catalyst are not especially limited, although a halogenated palladium, such as palladium chloride; an organic acid salt, such as palladium acetate; palladium nitrate, palladium oxide, or the like are preferable in view of cost. However, other palladium compounds, for example sodium palladium chloride, sodium palladium sulfate, and others can also be used.

The concentration of palladium on the carrier is preferably 0.1 to 20 percent by weight, as palladium metal, although the concentration can be varied over a broader range. Even if the concentration is less than 0.1 percent by weight, the reaction will proceed. Similarly, if the concentration is above 20 percent by weight, the present reaction will still be possible.

Suitable antimony, bismuth, tellurium and selenium compounds used for preparing the catalyst include halides, nitrates, sulfides, oxides and other compounds containing these elements. For example, halides, such as antimony chloride, bismuth chloride, tellurium (II) chloride, tellurium (IV) chloride, selenium (II) chloride and/or selenium (IV) chloride; oxides, such as antimony oxide, bismuth oxide, tellurium (IV) oxide, tellurium (VI) oxide and/or selenium oxide; or bismuth nitrate, antimony sulfide, bismuth sulfide, telluric acid, ortho telluric acid, selenic acid, tellurium sulfite, seleninyl chloride, etc. are typical. If desired, antimony metal, bismuth metal, tellurium metal and selenium metal may also be used.

Although any amount of antimony, bismuth, selenium and/or tellurium supported on the carrier will be broadly effective, in general, the preferable range is 0.03 to 30 percent by weight, based on total weight of the catalyst.

The ratio of antimony, bismuth, selenium and/or tellurium to palladium in the catalyst is preferably 0.01 to 10 gram atoms of total metals, per one gram atom of palladium, most preferably 0.05 to 5 gram atoms per one gram atom of palladium.

In this invention, the catalyst having the components supported on activated carbon and subjected to reduction is further subjected to oxidation and thereafter to reduction. The oxidation is usually conducted at a temperature of 200° to 600°C. The treating time is preferably above 30 minutes. A suitable gas for the oxidation includes oxygen diluted with an inert gas such as nitrogen, that is, for example, air, which is ordinarily used, although pure oxygen may also be utilized. Incidentally, it should be noted that activated carbon may burn violently under some severe reaction conditions.

The reduction following the above oxidation is preferably conducted in a stream of hydrogen or a reducing organic compound at a temperature above 200°C, preferably 250° to 600°C.

In the catalyst of the present invention, at least a part of the components, that is, palladium and at least one other selected from antimony, bismuth, selenium and tellurium, form an alloy on the carrier, although the actual state of these components has not been established. The catalyst is remarkably improved in activity and lifetime compared with catalysts prepared only by reducing the catalyst components supported on a carrier (for example U.S. Pat. No. 3,755,423). The improvement is considered to be due to the changes of uniformity, dispersion state and degree of crystallization of the alloy composition obtained by subjecting the catalyst to further oxidation and reduction.

Either subjecting the present catalyst to oxidation with oxygen and subsequent reduction or to repeated oxygen and reducing treatments will produce a catalyst having a longer lifetime.

The reaction of a conjugated diene with a carboxylic acid and oxygen according to the process of the present invention can be carried out by any conventional method using a fixed bed, a fluid bed, a suspension catalyst, or the like process. Any appropriate solvent may be used. The molecular oxygen-containing gas is not necessarily pure oxygen, but may be oxygen diluted with an inert gas, e.g. air. The amount of oxygen to be used is not critical, but preferably is within the range of 1 to 60 mole percent based on the total components of the feed gases.

In addition to the above described carboxylic acids, inert organic solvents, e.g. saturated hydrocarbons, esters, or the like, may be present in the reaction medium. The amount of carboxylic acid in the reactant is preferably above 50 percent, based on the weight of reaction medium.

The reaction is usually carried out at a temperature of about 20°C. Considering the reaction velocity and production of by-products, the preferable reaction temperature range is 60° to 180°C. The reaction pressure is not critical, but the reaction is usually carried out under atmospheric or superatmospheric pressures of about 200 atm. The reaction may be carried out under even higher pressures if desired.

According to the process of the present invention, a remarkably increased conversion and high degree of selectivity for the desired product can be attained in the preparation of an unsaturated glycol diester from a conjugated diene, as compared with the prior art methods. Thus, the process of the present invention is extremely advantageous as an industrial method for manufacturing unsaturated glycol diesters.

Having generally described the invention, a further understanding can be obtained by certain specific examples which are provided herein for purposes of illustration only and are not intended to be limiting in any manner.

COMPARATIVE EXAMPLE 1

Preparation of Catalyst

A 10 g amount of crushed 20–50 mesh coconut shell activated carbon was added to 30 ml of an aqueous solution of 30 percent by weight nitric acid, containing 2 mmol of dissolved palladium nitrate and 0.6 mmol of tellurium dioxide. The mixture was refluxed for 4 hours, and the solvent was removed with an evaporator under reduced pressure to dryness. A stream of nitrogen was passed at 150°C for 2 hours to dry the mixture completely. Thereafter, the mixture was reduced by passing nitrogen gas saturated with methanol at room temperature at a flow rate of 1 l per minute at 200°C for 2 hours and then at 400°C for 1 hour.

Carboxylation

The catalyst so prepared was placed into an induction revolution autoclave of 300 ml inner capacity, connected with a pressure source via a pressure regulating apparatus, together with 200 ml of glacial acetic acid. After purging the inside of the autoclave with nitrogen, 200 mmol of butadiene were added, and after pressurizing 3 Kg/cm$^2$ of nitrogen into the autoclave, the mixture was heated to 80°C. The nitrogen pressure was raised to 27 Kg/cm$^2$. About 100 Kg/cm$^2$ of oxygen were placed into the pressure source and oxygen of 3 Kg/cm$^2$ partial pressure was supplied into the autoclave while maintaining the pressure regulating apparatus at 30 Kg/cm$^2$. After conducting the reaction for 2 hours, the autoclave was cooled rapidly and the contents were analyzed by gas chromatography.

COMPARATIVE EXAMPLE 2

A catalyst prepared as in Comparative Example 1 was treated with nitrogen gas containing 2 percent oxygen at a flow rate of 1 l per minute at 300°C for 10 hours. Using the catalyst so prepared the carboxylation of butadiene was conducted as in Comparative Example 1.

EXAMPLE 1

A catalyst prepared as in Comparative Example 2 was reduced again by passing nitrogen gas saturated with methanol at room temperature at a flow rate of 1 l per miute at 200°C for 2 hours and then at 400°C for 1 hour. Using the catalyst so prepared the carboxylation of butadiene was conducted as in Comparative Example 1.

The results of the above examples are summarized in Table 1.

Table 1

|  | Amount of diacetoxybutenes produced (mmol/hr · g cat.) | Selectivity* for diacetoxybutenes (%) | Selectivity* for 1,4-diacetoxy-2-butene (%) |
| --- | --- | --- | --- |
| Comparative Example 1 | 2.9 | 99.4 | 89.5 |
| Comparative Example 2 | 3.9 | 99.6 | 92.5 |
| Example 1 | 5.4 | 99.3 | 89.5 |

*Values calculated on the basis of butadiene consumed.

As is evident from Table 1, the catalyst of the present invention exhibits remarkably improved activity, as shown by the amount of diacetoxybutene produced per 1 g of catalyst per 1 hour.

COMPARATIVE EXAMPLE 3

An 800 ml amount of an aqueous solution of 15 percent by weight nitirc acid was added to 50 g of crushed 20–50 mesh coconut shell activated carbon, and the mixture was refluxed for 1 hour. After removing the aqueous nitric acid be decantation, the activated carbon was washed with desalted water and then dried at 90°C under reduced pressure (20 mm Hg). The 10 g of activated carbon thus treated with nitric acid were immersed in 40 ml of 6N hydrochloric acid containing 2 mmol of dissolved palladium chloride and 0.6 mmol of tellurium dioxide, and were heated slowly to dryness on a water bath. After passing a stream of nitrogen at 150°C for 2 hours to dry the mixture completely, the mixture was reduced at 200°C for 2 hours and then at 400°C for 1 hour by passing nitrogen gas saturated with methanol at room temperature at a flow rate of 1 l per minute. Using the catalyst so prepared, the carboxylation of butadiene was conducted as in Comparative Example 1.

EXAMPLE 2

A catalyst prepared as in Comparative Example 3 was subjected to oxygen treatment by passing nitrogen gas containing 2 percent oxygen at a flow rate of 1 l per minute at 300°C for 20 hours, and was reduced again by passing nitrogen gas saturated with methanol at 200°C for 2 hours and then at 400°C for 1 hour. Using the catalyst so prepared, the carboxylation of butadiene was conducted as in Comparative Example 1.

The results are summarized in Table 2.

Table 2

|  | Amount of diacetoxybutenes produced (mmol/hr · g cat.) | Selectivity* for diacetoxybutenes (%) | Selectivity* for 1,4-diacetoxy-2-butene (%) |
| --- | --- | --- | --- |
| Comparative Example 3 | 6.4 | 99.1 | 90.9 |
| Example 2 | 7.6 | 99.3 | 90.5 |

*Values calculated on the basis of butadiene consumed.

COMPARATIVE EXAMPLE 4

A 10 g amount of activated carbon treated with nitric acid as in Comparative Example 3 was immersed in 40 ml of an aqueous solution of 30 percent by weight nitric acid containing 2 mmol of dissolved palladium nitrate and 0.6 mmol of metallic tellurium and was heated slowly to dryness on a water bath. After passing a stream of nitrogen at 150°C for 2 hours to dry the mixture completely, the mixture was reduced at 200°C for 2 hours and then at 300°C for 1 hour by passing hydrogen at a flow rate of 1 l per minute. Using the catalyst so prepared the carboxylation reaction of butadiene was conducted as in Comparative Example 1.

EXAMPLE 3

A catalyst prepared as in Comparative Example 4 was subjected to oxygen treatment by passing nitrogen gas containing 2 percent oxygen at a flow rate of 1 l per minute at 300°C for 10 hours, and was reduced again by passing hydrogen at 200°C for 4 hours and then at 400°C for 4 hours. Using the catalyst so prepared the carboxylation of butadiene was conducted as in Comparative Example 1.

The results are summarized in Table 3.

Table 3

|  | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 4 | 6.9 | 98.7 | 89.9 |
| Example 3 | 9.8 | 99.1 | 90.9 |

*Values calculated on the basis of butadiene consumed.

COMPARATIVE EXAMPLE 5

A 10 g amount of crushed coconut shell activated carbon was degassed under a reduced pressure of $10^{-3}$ mm Hg at 150°C for 2 hours, and was subsequently iced and impregnated with n-octane under reduced pressure. After removing the excess n-octane, the activated carbon was immersed in 40 ml of 6N hydrochloric acid containing 2 mmol of dissolved palladium chloride and 0.6 mmol of tellurium dioxide and was heated slowly to dryness on a water bath. After passing a stream of nitrogen at 200°C for 2 hours to dry the mixture completely, the mixture was reduced by passing nitrogen gas saturated with methanol at room temperature at a flow rate of 1 l per minute at 200°C for 2 hours and than at 400°C for 4 hours. Using the catalyst so prepared the carboxylation reaction of butadiene was conducted as in Comparative Example 1.

COMPARATIVE EXAMPLE 6

A catalyst prepared as in Comparative Example 5 was subjected to oxygen treatment by passing nitrogen gas containing 2 percent oxygen at a flow rate of 1 l per minute at 300°C for 20 hours. Using the catalyst so prepared the carboxylation was conducted as in Comparative Example 1.

EXAMPLE 4

A catalyst prepared as in Comparative Example 6 was subjected to reduction conditions by passing nitrogen gas saturated with methanol at room tempeature at 200°C for 2 hours and then at 400°C for 1 hour. Using the catalyst so prepared the carboxylation of butadiene was conducted as in Comparative Example 1.

The results are summarized in Table 4.

Table 4

|  | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 5 | 2.9 | 99.3 | 88.5 |
| Comparative Example 6 | 4.4 | 99.3 | 91.8 |
| Example 4 | 6.4 | 99.3 | 90.8 |

*Values calculated on the basis of butadiene consumed.

COMPARATIVE EXAMPLE 7

A 10 g amount of crushed 20–50 mesh coconut shell activated carbon was added to 30 ml of an aqueous solution of 30 percent by weight nitric acid containing 2 mmol of dissolved palladium nitrate and 0.6 mmol of tellurium dioxide and the mixture was refluxed for 4 hours. The solvent was removed with an evaporator under reduced pressure to dryness, and then the solid was suspended in water. After adding an aqueous solution of sodium hydroxide to make the suspension alkaline, an aqueous solution of hydrazine was added and the mixture was reduced for 1 hour while heating at 60°C. After washing with water, the solid was dried at 60°C under reduced pressure. Using the catalyst so prepared the carboxylation of butadiene was conducted as in Comparative Example 1.

EXAMPLE 5

A catalyst prepared as in Comparative Example 7 was subjected to oxygen treatment by passing nitrogen gas containing 2 percent oxygen at a flow rate of 1 l per minute at 300°C for 10 hours and subsequently was reduced again using hydrogen at 200°C for 2 hours and then at 400°C for 4 hours. Using the catalyst so prepared the carboxylation of butadiene was conducted as in Comparative Example 1.

The results are summarized in Table 5.

Table 5

|  | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 7 | 2.0 | 94.9 | 91.6 |
| Example 5 | 3.9 | 97.5 | 89.8 |

*Values calculated on the basis of butadiene consumed.

COMPARATIVE EXAMPLE 8

The preparation of the catalyst and the carboxylation of butadiene were conducted as in Comparative Example 1 with the exception of substituting 2 mmol of antimony trichloride for tellurium and 6N hydrochloric acid for nitric acid at the time of preparation of the catalyst.

EXAMPLE 6

A catalyst prepared as in Comparative Example 8 was subjected to oxygen treatment by passing nitrogen gas containing 2 percent oxygen at a flow rate of 1 l per minute at 300°C for 10 hours, and subsequently was reduced by passing nitrogen gas saturated with methanol at room temperature at a flow rate of 1 l per minute at 200°C for 2 hours and then at 400°C for 1 hour. Using the catalyst so prepared the carboxylation of butadiene was conducted as in Comparative Example 1.

The results are summarized in Table 6.

Table 6

| | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 8 | 0.7 | 96.2 | 57.6 |
| Example 6 | 2.0 | 97.7 | 77.6 |

*Values calculated on the basis of butadiene consumed.

COMPARATIVE EXAMPLE 9

The preparation of the catalyst and the carboxylation were conducted as in Comparative Example 1 with the exception of substituting a 2 mmol of bismuth nitrate for tellurium dioxide.

EXAMPLE 7

Using a catalyst prepared by subjecting the catalyst prepared in Comparative Example 9 to the same oxygen treatment and reduction conditions as in Example 6, the carboxylation of butadiene was conducted as in Comparative Example 1.

The results are summarized in Table 7.

Table 7

| | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 9 | 2.2 | 91.6 | 76.8 |
| Example 7 | 2.9 | 92.4 | 87.2 |

*Values calculated on the basis of butadiene consumed.

COMPARATIVE EXAMPLE 10

A reaction was conducted as in Comparative Example 1 with the exception of substituting 0.3 mmol of selenium dioxide for tellurium dioxide.

EXAMPLE 8

Using a catalyst prepared by subjecting the catalyst prepared in Comparative Example 10 to the same oxygen treatment and reduction conditions as in Example 7, the same reaction as in Comparative Example 1 was conducted.

The results are summarized in Table 8.

Table 8

| | Amount of diacetoxy-butenes produced (mmol/hr · g cat.) | Selectivity* for diacetoxy-butenes (%) | Selectivity* for 1,4-diacetoxy-2-butene (%) |
|---|---|---|---|
| Comparative Example 10 | 2.9 | 98.7 | 87.4 |
| Example 8 | 4.2 | 98.6 | 89.7 |

*Values calculated on the basis of butadiene consumed.

COMPARATIVE EXAMPLE 11

A 20 g amount of crushed 20–50 mesh coconut shell activated carbon was added to 60 ml of an aqueous solution of 30 percent by weight nitric acid containing 4 mmol palladium nitrate and 1.2 mmol of tellurium dioxide, and the mixture was refluxed for 4 hours. The solvent was removed with an evaporator under pressure to dryness. After passing a stream of nitrogen at 150°C for 1 hour to dry the mixture completely, the mixture was reduced by passing a methanol-containing gas at 200°C for 2 hours and then at 400°C for 4 hours. The mixture was then subjected to oxidation conditions by passing nitrogen gas containing 2 percent oxygen at 300°C for 1 hour. The catalyst so prepared filled a glass reaction tube 20 mm in inner diameter, and glacial acetic acid, butadiene and oxygen were passed through the tube at a flow rate of 90 ml per hour, 275 mmol per hour and 178 mmol per hour, respectively, to be reacted continuously.

The amount of diacetoxybutenes produced per 1 g of catalyst per 1 hour at an appropriate time after the reaction was initiated is shown in TAble 9.

EXAMPLE 9

A catalyst prepared by supporting the components on a carrier and reducing with a methanol-containing gas as in Comparative Example 11 was subjected to oxygen treatment at 300°C for 15 hours using nitrogen gas containing 2 percent oxygen, and subsequently was subjected to reduction conditions by a methanol-containing gas at 400°C for 15 hours, and then to reoxidation conditions at 300°C for 1 hour using nitrogen gas containing 2 percent oxygen.

Using the catalyst so prepared the continuous reaction was carried out as in Comparative Example 11.

The results are summarized in Table 9.

Table 9

| Total reaction time (hour) | Amount of diacetoxybutenes produced (mmol/hr. · g catalyst) | |
|---|---|---|
| | Comparative Example 11 | Example 9 |
| 30 | 1.22 | 1.60 |
| 50 | 1.12 | 1.57 |
| 100 | 1.00 | 1.32 |
| 200 | 0.77 | 1.15 |
| 300 | 0.62 | 0.96 |
| 400 | 0.50 | 0.87 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for the production of unsaturated diesters, which comprises reacting a conjugated diene, having the formula:

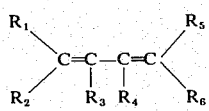

wherein $R_1$, $R_2$, $R_3$, $R_4$, $R_5$ and $R_6$ may be the same or different and each represents hydrogen or an alkyl group having 1 to 6 carbon atoms, a carboxylic acid selected from the group consisting of aliphatic, aromatic and alicyclic carboxylic acids, and molecular oxygen in the presence of a solid catalyst consisting essentially of palladium and at least one component selected from the group consisting of antimony, bismuth, tellurium and selenium supported on activated carbon, which catalyst is prepared by reducing said catalyst with hydrogen or a reducing organic compound selected from the group consisting of gaseous methanol, carbon monoxide, formaldehyde, formic acid and ethylene and solutions of hydrazine and formaldehyde, treating said reduced catalyst with oxygen or and oxygen-containing gas at a temperature above 200°C and then reducing the oxidized catalyst with hydrogen or a reducing organic compound selected from the groups consisting of gaseous methanol, carbon monoxide, formaldehyde, formic acid and ethylene and solutions of hydrazine and formaldehyde at a temperature of at least 200°C.

2. The process of claim 1 wherein the conjugated diene is isoprene, 2,3-diemthylbutadiene or piperylene.

3. The process of claim 1 wherein the conjugated diene is butadiene.

4. The process of claim 1 wherein the activated carbon is treated with nitric acid.

5. The process of claim 1 wherein the reduction is carried out with hydrogen.

6. The process of claim 1 wherein the reduction is carried out with a reducing organic compound.

7. The process of claim 6, wherein said organic compound is methanol.

8. The process of claim 6, wherein said organic compound is hydrazine.

9. The process of claim 1, wherein the catalyst consists essentially of palladium and anitmony.

10. The process of claim 1, wherein the catalyst consists essentially of palladium and bismuth.

11. The process of claim 1, wherein the catalyst consists essentially of palladium and tellurium.

12. The process of claim 1, wherein the catalyst consists essentially of palladium and selenium.

13. The process of claim 1, wherein the amount of at least one of the antimony, bismuth, tellurium and seleunium components supported on activated carbon is 0.01 to 30 percent by weight, as the metal.

14. The process of claim 1, wherein the catalyst consists essentially of palladium and 0.01 to 10 total gram atoms of at least one antimony, bismuth, tellurium and selenium component per 1 gram atom of palladium.

15. The process of claim 1, wherein the reaction temperature is 60° to 180°C.

16. The process of claim 1, wherein the catalyst is prepared by supporting a mixture of palladium and at least one element selected from the group consisting of antimony, bismuth, tellurium and selenium on activated carbon, heating said mixture in a stream of hydrogen or a reducing organic compound, subsequently heating said mixture in a stream of oxygen or an oxygen-containing gas at a temperature of 200° to 600°C, and further heating said mixture in a stream of hydrogen or a reducing organic compound at a temperature of 200° to 600°C.

17. A process for the producing of diacetoxybutenes, which comprises:
reacting butadiene, acetic acid and oxygen in the presence of a solid catalyst consisting essentially of palladium and tellurium supported on activated carbon, and, after subjecting said catalyst to reduction with hydrogen or a reducing organic compound selected from the group consisting of gaseous methanol, carbon monoxide, formaldehyde, formic acid and ethylene and a solution of hydrazine and formaldehyde, oxidizing said catalyst with oxygen or an oxygen-containing gas at a temperature above 200°C and further reducing said oxidized catalyst with hydrogen or a reducing organic compound selected from the group consisting of gaseous methanol, carbon monoxide, formaldehyde, formic acid, and ethylene and solutions of hydrazine and formaldehyde at a temperature of at lease 200°C.

18. The process of claim 17 wherein the activated carbon is treated with nitric acid.

19. The process of claim 17 wherein the reduction is carried out with hydrogen.

20. The process of claim 17 wherein the reduction is carried out with a reducing organic compound.

21. The process of claim 20 wherein said organic compound is methanol.

22. The process of claim 20 wherein said organic compound is hydrazine.

23. The process of claim 17, wherein the amount of tellurium supported on activated carbon is 0.01 to 30 percent by weight, as the metal.

24. The process of claim 17, wherein the catalyst consists essentially of palladium and 0.01 to 10 gram atom of tellurium per 1 gram atom of palladium.

25. The process of claim 17, wherein the reaction temperature is 60° to 180°C.

* * * * *